(12) United States Patent
Tamakoshi et al.

(10) Patent No.: US 10,725,465 B2
(45) Date of Patent: Jul. 28, 2020

(54) STATE DIAGNOSTIC DEVICE

(71) Applicant: Okuma Corporation, Niwa-Gun (JP)

(72) Inventors: Takahiro Tamakoshi, Niwa-Gun (JP); Hiroshi Ueno, Niwa-Gun (JP); Tomoharu Ando, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 298 days.

(21) Appl. No.: 15/900,965

(22) Filed: Feb. 21, 2018

(65) Prior Publication Data

US 2018/0259951 A1 Sep. 13, 2018

(30) Foreign Application Priority Data

Mar. 7, 2017 (JP) .................................. 2017-043108

(51) Int. Cl.
G05B 23/02 (2006.01)
G01M 13/00 (2019.01)
G05B 19/418 (2006.01)

(52) U.S. Cl.
CPC ......... *G05B 23/0275* (2013.01); *G01M 13/00* (2013.01); *G05B 23/024* (2013.01); *G05B 23/0297* (2013.01); *G05B 19/4184* (2013.01)

(58) Field of Classification Search
None
See application file for complete search history.

(56) References Cited

U.S. PATENT DOCUMENTS

| 8,515,719 B2 | 8/2013 | Tamaki et al. | |
|---|---|---|---|
| 8,762,106 B2 * | 6/2014 | Miller | G05B 17/02 702/179 |
| 2005/0043922 A1 * | 2/2005 | Weidl | G06N 5/04 702/183 |
| 2014/0365271 A1 * | 12/2014 | Smiley | G06Q 10/0635 705/7.28 |
| 2019/0025805 A1 * | 1/2019 | Cella | G05B 19/4184 |

FOREIGN PATENT DOCUMENTS

| JP | 2002-090267 | 3/2002 |
|---|---|---|
| JP | 5108116 | 12/2012 |

* cited by examiner

*Primary Examiner* — Tung S Lau
(74) *Attorney, Agent, or Firm* — Burr & Brown, PLLC

(57) ABSTRACT

A state diagnostic device collects a usage state and diagnostic data of components, and selects, from the collected diagnostic data, at least one of diagnostic data obtained in a state where the usage state of the components is a truly normal state and diagnostic data obtained in a state where the usage state of the components is a truly abnormal state. The selected diagnostic data is defined as master data. A diagnosis result obtained by diagnosing the master data based on a current diagnostic model is compared with a diagnosis result obtained by diagnosing the master data based on a new diagnostic model, and whether the current diagnostic model is consistent with the new diagnostic model is determined. When the consistency is satisfied, the diagnostic model is updated from the current diagnostic model to the new diagnostic model.

3 Claims, 4 Drawing Sheets

FIG.4

| CONSISTENCY DETERMINATION RESULT ||
|---|---|
| NAME OF COMPONENT | CONSISTENCY |
| COMPONENT 1 | SATISFIED |
| COMPONENT 2 | UNSATISFIED |
| . . . | . . . |
| COMPONENT N | SATISFIED |

STATE DIAGNOSTIC DEVICE

This application claims the benefit of Japanese Patent Application Number 2017-043108 filed on Mar. 7, 2017, the entirety of which is incorporated by reference.

BACKGROUND

Field of the Invention

The present invention relates to a state diagnostic device that diagnoses an industrial machine, such as a machine tool, and that monitors a degree of progression of an abnormality and determines a cause of the abnormality in the industrial machine.

Description of Related Art

Improvement in production efficiency is the most important issue in the manufacturing industry. Once a production line stops due to a failure of an industrial machine, the production efficiency is significantly reduced. To prevent such a problem, daily preventive maintenance of the industrial machine, in particular, condition-based maintenance thereof is the most important. Thus, state diagnostic devices for diagnosing state of the industrial machine have been designed to perform the maintenance. For example, Japanese Patent No. 5108116 discloses a state diagnostic device that performs the condition-based maintenance using a regression analysis. The state diagnostic device obtains a plurality of pieces of state data of an apparatus to be diagnosed during a normal state thereof, and uses the regression analysis to classify the data and create a diagnostic model from the state data. The state diagnostic device uses the created diagnostic model to calculate the state of the apparatus based on a degree of deviation, and compares the result with a threshold to make a diagnosis, such as detection of an abnormality. Further, Japanese Patent Application Publication No. 2002-090267 (JP 2002-90267 A) discloses a state diagnostic device that performs the condition-based maintenance using a neural network. The state diagnostic device creates a neural network model (diagnostic model) for each type of abnormality based on many pieces of normal data and a very few pieces of abnormal data. The state diagnostic device performs preprocessing on time-series data obtained from an apparatus to be diagnosed, the processing being set for each type of abnormality. The state diagnostic device individually determines the data based on each of the diagnostic models to make a diagnosis, such as detection of an abnormality.

When machine learning is applied to the state diagnosis of the industrial machine, the diagnostic model needs to be updated for improving accuracy of the diagnosis, increasing diagnosable types of abnormality, and correcting problems in the diagnosis. However, in the conventional state diagnostic devices, the diagnostic model is not assumed to be updated, which results difficulty to improve diagnostic accuracy through application of the machine learning. In addition, updating the diagnostic model may cause inconsistency of diagnostic results between before and after the update. In other words, diagnostic data diagnosed to be normal before the update may be diagnosed to be abnormal after the update.

SUMMARY

In view of the above-described problems, the present invention is intended to provide a state diagnostic device that easily and accurately updates a diagnostic model without causing a problem before and after being updated, by which diagnostic accuracy is improved through application of the machine learning.

To achieve the object described above, according to a first aspect of the present disclosure, a state diagnostic device that diagnoses a state of an industrial machine by diagnosing diagnostic data based on a certain diagnostic model, the diagnostic data being obtained from at least one component of interest in the industrial machine. The state diagnostic device includes a data collection unit that collects a usage state and the diagnostic data of the component, a master selection unit that selects as master data, from the diagnostic data collected by the data collection unit, at least one of the diagnostic data obtained in a state where the usage state of the component is a truly normal state and the diagnostic data obtained in a state where the usage state of the component is a truly abnormal state, a storage unit that stores the selected master data, and a consistency determination unit that compares a diagnosis result obtained by diagnosing the master data based on the current diagnostic model with a diagnosis result obtained by diagnosing the master data based on a new diagnostic model, and that determines whether the current diagnostic model is consistent with the new diagnostic model. The state diagnostic device updates the diagnostic model from the current diagnostic model to the new diagnostic model when the consistency is satisfied.

According to a second aspect of the present disclosure, in the first aspect of the present disclosure, the usage state may be a cumulative operation amount from when the component starts to be used until when the component is replaced or repaired, and the truly normal state may be a state at a time when the cumulative operation amount exceeds a certain specified amount from when the component starts to be used, and the truly abnormal state may be a state at a time when the cumulative operation amount reaches an amount at which the component is replaced or repaired.

According to a third aspect of the present disclosure, in the first or second aspect of the present disclosure, the state diagnostic device may determine whether the component is normal or abnormal as a result of the diagnosis based on the diagnostic model. The consistency determination unit may determine that the consistency is satisfied when the determination results about normal or abnormal agree between the current diagnostic model and the new diagnostic model with respect to every component, and when a certainty factor of the determination results of normal or abnormal based on the new diagnostic model is not lower than that of the determination of normal or abnormal based on the current diagnostic model.

According to the present disclosure, the state diagnostic device collects the use state and the diagnostic data of the components, and selects from the collected diagnostic data, at least one of the diagnostic data obtained in the state where the use state of the components is the truly normal state and the diagnostic data obtained in the state where the use state of the components is the truly abnormal state, the selected diagnostic dada being the master data. The diagnosis result obtained by diagnosing the master data based on the current diagnostic model is compared with the diagnosis result obtained by diagnosing the master data based on the new diagnostic model to determine whether the current diagnostic model is consistent with the new diagnostic model. When the consistency is satisfied, the diagnostic model is updated from the current diagnostic model to the new diagnostic model. Accordingly, the master data can be efficiently obtained, and furthermore, the diagnostic model can be easily and accurately updated while causing no problem before and after being updated. As a result, by application of, the machine leaning, the state diagnostic device can more accurately detect a variety of abnormalities and causes thereof.

BRIEF DESCRIPTION OF THE DRAWINGS

FIG. 4 is an explanatory diagram illustrating consistency determination results that are output.

DETAILED DESCRIPTION OF THE EMBODIMENT

The following describes in detail a state diagnostic device according to an embodiment of the present invention based on the drawings.

Figure 1:
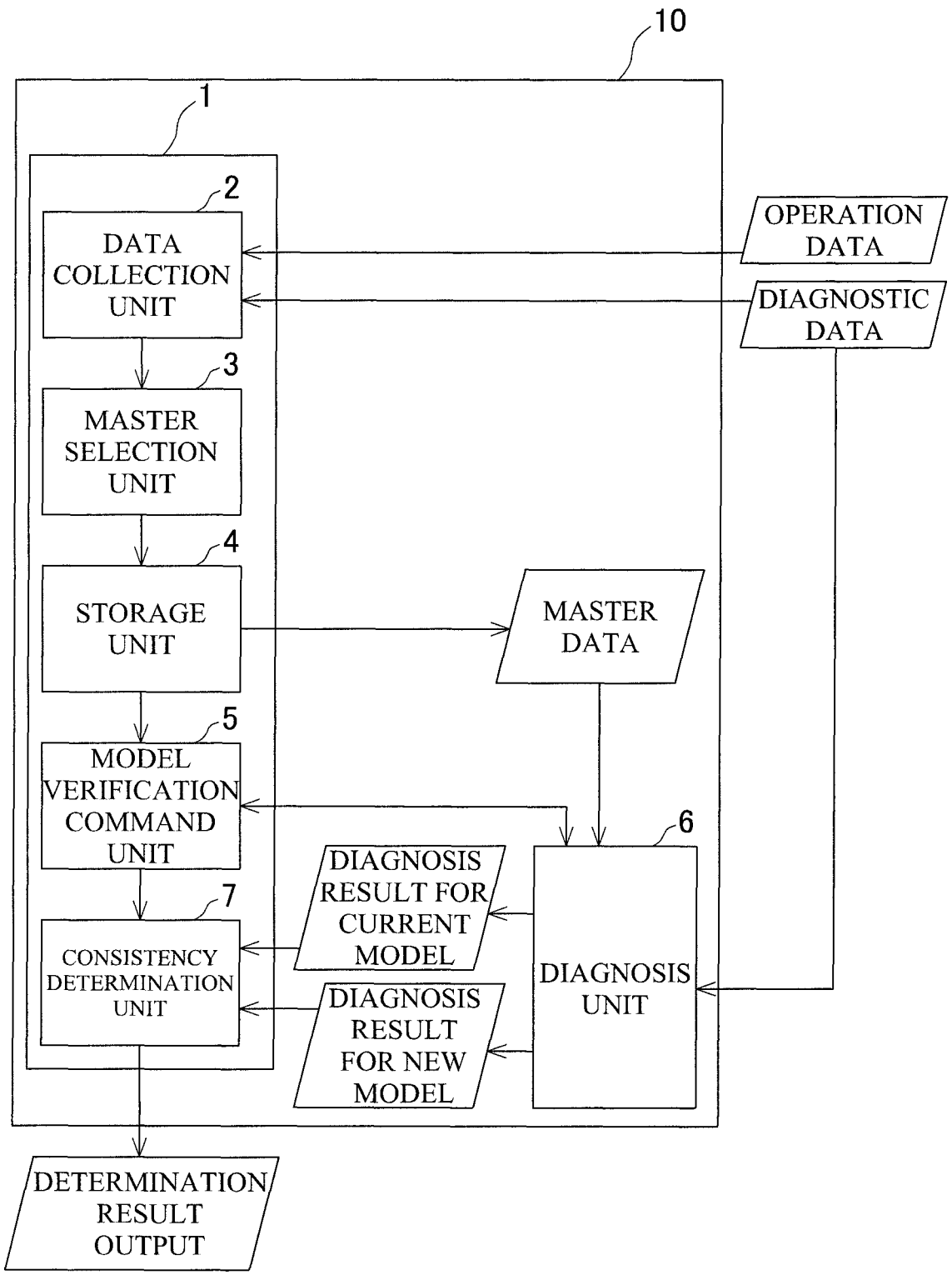
FIG. 1 is a block configuration diagram of a state diagnostic device.

FIG. 1 is a block configuration diagram of a state diagnostic device 10.

The state diagnostic device 10 is a device that diagnoses a state of an industrial machine, such as a machine tool. The state diagnostic device 10 includes a model verification unit 1 that verifies whether the current diagnostic model is consistent with a new diagnostic model, a diagnosis unit 6 that diagnoses the state of the industrial machine using diagnostic data (for example, detection values obtained from various sensors, such as acceleration sensors and temperature sensors) obtained from the industrial machine and makes diagnoses of master data based on the old and new diagnostic models as will be described later, and a model creation unit (not illustrated) that creates the diagnostic models from data such as the diagnostic data and experimental data obtained by experiments. The diagnostic models are created using data obtained from the industrial machine, through machine learning, such as learning using a neural network.

The model verification unit 1 includes a data collection unit 2 that constantly collects operation data (usage state) and the diagnostic data of the industrial machine, a master selection unit 3 that selects the master data from the diagnostic data collected by the data collection unit 2, a storage unit 4 that stores the selected master data, a model verification command unit 5 that commands verification between the old and new diagnostic models at the time of update of the diagnostic model, and a consistency determination unit 7 that verifies the old and new diagnostic models to determine whether the consistency is satisfied, and outputs the determination result.

The selection of the master data will first be described. In the present embodiment, the operation data is defined as a cumulative operation amount. The data collection unit 2 collects the cumulative operation amounts of components of interest, such as bearings and motors of the industrial machine, on a component-by-component basis. For each of the components, a state where the component starts to be used after a running-in operation, namely a state immediately after the cumulative operation amount has exceeded a certain specified amount A, is assumed to be a truly normal state. A state immediately before the component is replaced or repaired due to a failure or the like, namely a state where the cumulative operation amount reaches a maximum value immediately before being reset to zero, is assumed to be a truly abnormal state. The master selection unit 3 narrows down the collected diagnostic data to diagnostic data obtained in both the above-described states. The master selection unit 3 diagnoses the narrowed-down diagnostic data using the current diagnostic model, and determines whether the component is normal or abnormal. Subsequently, the master selection unit 3 compares the diagnostic results with actual status of whether the component is normal or abnormal, and selects the diagnostic data for which the determination of whether the component is normal or abnormal agrees with the actual status. The selected diagnostic data is defined as master data. The master selection unit 3 performs such selection of the master data for all the individual components of interest, and stores the selected diagnostic data as master data in the storage unit 4.

Figure 2:
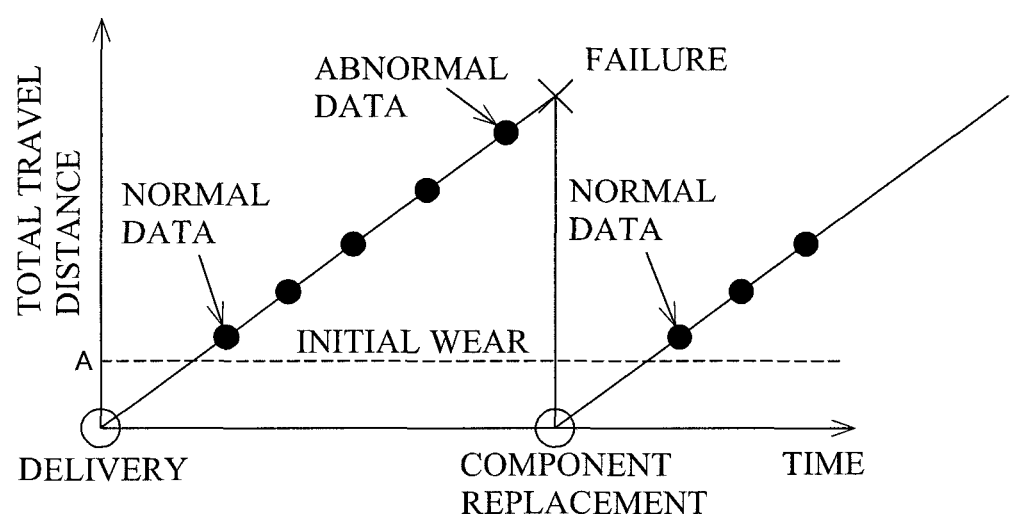
FIG. 2 is an explanatory diagram of cases where a truly normal state and a truly abnormal state are determined based on a usage state.

The cumulative operation amount may be an amount representing wear and tear of a component, such as the number of rotations, a travel distance, or an operating time. The master data corresponding to the truly abnormal state may be obtained by performing a diagnostic operation immediately before replacing or repairing the component. Furthermore, if the diagnostic operation cannot be performed because a severe abnormality such as a machine collision has unexpectedly occurred, the master data corresponding to the abnormal state may not be obtained. In addition, since initial wear of the component is preferably taken into account, the master data is selected only among the diagnostic data obtained not when the cumulative operation amount is zero, but when the cumulative operation amount has exceeded the specified amount A. As described in "Kenya Kikuchi, Running-in Behavior of Repeated Dry Wear on Metals, Journal of the Association of Materials Engineering for Resources, 11(2), 1998, pp. 12-20", the specified amount A may be determined by examining, for example, the travel distance or the number of rotations at which the amount of abrasion powder is stabilized, by conducting an experiment in advance. When a total travel distance is assumed to be the cumulative operation amount of a certain component, the diagnostic data obtained at times illustrated in FIG. 2 is employed as the master data.

Figure 3:
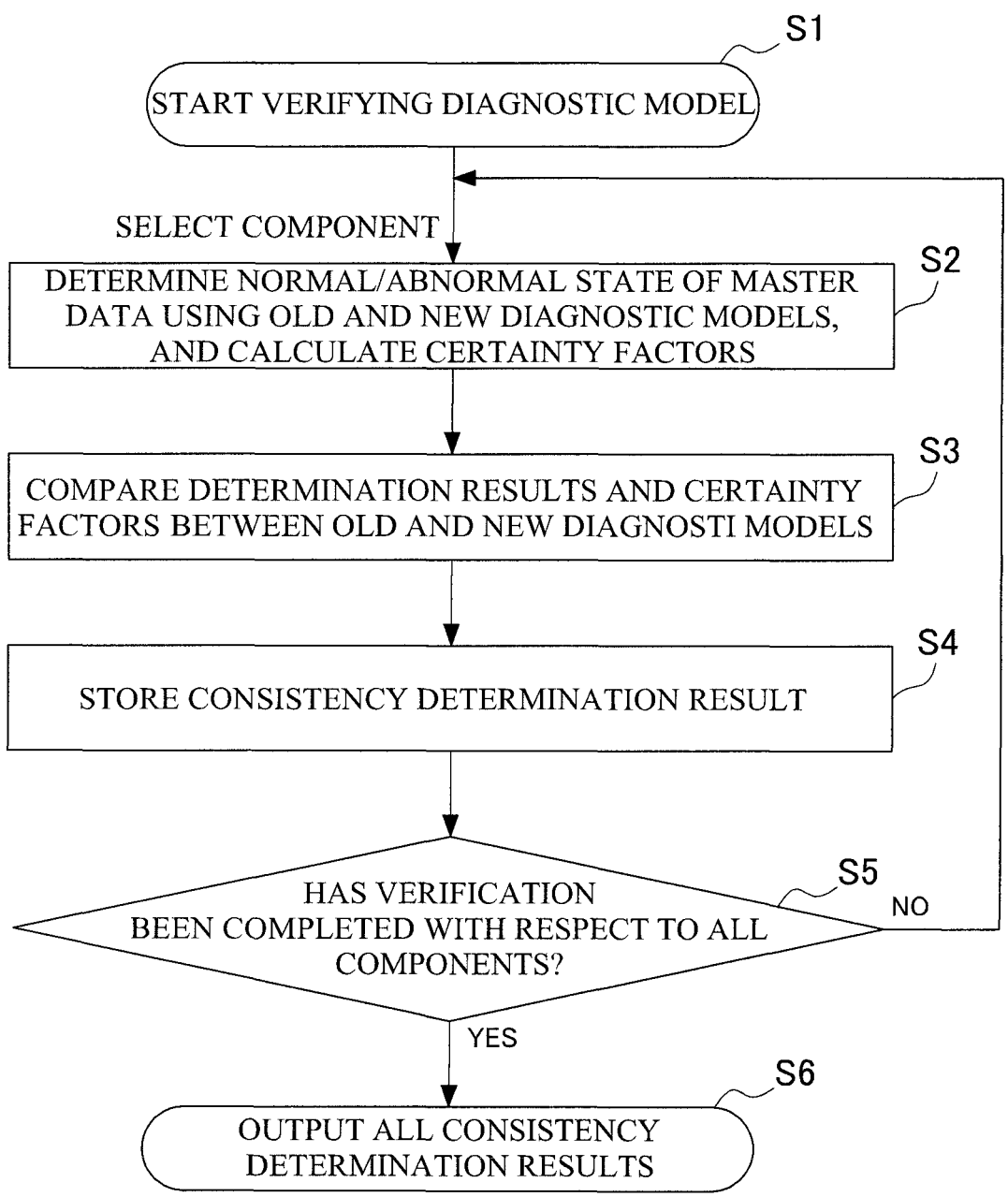
FIG. 3 is a flowchart for verification of consistency of a diagnostic model.

The following describes the verification of the consistency between the old and new diagnostic models at the time of the update of the diagnostic model, with reference to FIG. 3. When the new diagnostic model has been created and the verification of the diagnostic model is started (S1), one component k ($1 \leq k \leq N$) of interest is selected from N components to be diagnosed in the industrial machine, and a command is transmitted from the model verification command unit 5 to the diagnosis unit 6 and the consistency determination unit 7. The diagnosis unit 6 then reads the master data for the component k from the storage unit 4, and performs diagnosis of the master data using both the old and new diagnostic models (S2). The diagnosis results based on the respective diagnostic models are transmitted to the consistency determination unit 7. The consistency determination unit 7 determines whether the diagnosis results (such as determination results about normal or abnormal) for the component k are consistent between the old and new diagnostic models (S3), and temporarily stores the consistency determination result (S4). The consistency determination unit 7 determines the consistency for all the N components, and when confirming that the verification of the consistency has been completed (Yes at S5), externally outputs the consistency determination results for all the N components (S6).

A method for determining the consistency will be described. The determination uses a label $L_k$ indicating whether the component k is normal or abnormal and a value of a certainty factor $X_k$ calculated when the determination of normal or abnormal is made. The certainty factor refers to a value indicating accuracy of the determination about normal or abnormal, that is, a value indicating that the determination of normal or abnormal is more probably correct as the value is greater. For example, a correlation coefficient or an output value of a unit of the neural network should be freely employed as the certainty factor. Let $L_k1$ denote a label determined by the diagnosis based on the current diagnostic model (old diagnostic model) of the master data and $X_k1$ denote a certainty factor, and let $L_k2$ denote a label determined by the diagnosis based on the new diagnostic model of the master data and $X_k2$ denotes a certainty factor. When the results of the determination agree as to whether the component k is normal or abnormal (that is, $L_k1=L_k2$) and the certainty factor has not dropped (that is, $X_k2-X_k1 \geq 0$), the old and new diagnostic models are determined to be consistent with each other with respect to the component k. Examples of the consistency determination results that are finally externally output include those illustrated in FIG. 4. The labels ($L_k1$ and $L_k2$) and the certainty factors ($X_k1$ and $X_k2$) used for the determination of the consistency may also be output.

When the consistency is satisfied with respect to all the components as described above, the current diagnostic model is updated to the new diagnostic model. When, instead, the consistency is not satisfied with respect to part of the components, the model is not updated, or the new model is used for only components whose diagnostic models are consistent.

The state diagnostic device 10 is configured to collect the usage state and the diagnostic data of the components, and select the master data, from the collected diagnostic data. The collected data consists of the diagnostic data obtained in the state where the usage state of the components is the truly normal state and the diagnostic data obtained in the state where the usage state of the components is the truly abnormal state. The state diagnostic device 10 compares the diagnosis result obtained by diagnosing the master data based on the current diagnostic model with the diagnosis result obtained by diagnosing the master data based on the new diagnostic model, and determines whether the current diagnostic model is consistent with the new diagnostic model. When the consistency is satisfied, the state diagnostic device 10 updates the diagnostic model from the current diagnostic model to the new diagnostic model. Accordingly, the state diagnostic device 10 can efficiently obtain the master data, and can easily and accurately update the diagnostic model that does not cause a problem before and after being updated. Furthermore, by application of, for example, the machine leaning, the state diagnostic device 10 can more accurately detect a variety of abnormalities and causes thereof.

The configuration of the state diagnostic device according to the present invention is not limited to the embodiment described above. Not only the overall configuration of the device, but also the configurations related to the verification and update of the diagnostic model can be appropriately modified as needed without departing from the gist of the present invention.

In the embodiment described above, the operation data, such as the number of rotations, the travel distance, or the operating time is employed as the usage state. However, a usage state other than such data can be employed. To take into account a time other than the operation period, for example, a time from installation can be employed as the usage state.

The usage state varies between individual industrial machines. Therefore, machines that are industrial machines of the same type may individually have the master data.

Moreover, the repair may include, for example, retightening of a loosened component. Furthermore, the model creation unit may be provided outside the state diagnostic device.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A state diagnostic device that diagnoses a state of an industrial machine by diagnosing diagnostic data based on a certain diagnostic model, the diagnostic data being obtained from at least one component of interest in the industrial machine, the state diagnostic device comprising:
    a data collection unit that collects a usage state and the diagnostic data of the component;
    a master selection unit that selects as master data, from the diagnostic data collected by the data collection unit, at least one of the diagnostic data obtained in a state where the usage state of the component is a truly normal state and the diagnostic data obtained in a state where the usage state of the component is a truly abnormal state;
    a storage unit that stores the selected master data; and
    a consistency determination unit that compares a diagnosis result obtained by diagnosing the master data based on a current diagnostic model with a diagnosis result obtained by diagnosing the master data based on a new diagnostic model, and that determines whether the current diagnostic model is consistent with the new diagnostic model, wherein
    the state diagnostic device updates the diagnostic model from the current diagnostic model to the new diagnostic model when the consistency is satisfied; and
    wherein the usage state is a current operation amount from when the component starts to be used, until when the component is replaced or repaired, and
    the truly normal start is a state at a time when the cumulative operation amount exceeds a certain specific amount from when the component starts to be used, and the truly abnormal state is a state at a time when the cumulative operation amount reaches an amount at which the component is replaced or repaired.

2. The state diagnostic device according to claim 1, wherein
    the state diagnostic device determines whether the component is normal or abnormal as a result of the diagnosis based on the diagnostic model, and
    the consistency determination unit determines that the consistency is satisfied when the determination results about normal or abnormal agree between the current diagnostic model and the new diagnostic model with respect to every component, and when a certainty factor of the determination results of normal or abnormal based on the new diagnostic model is not lower than that of the determination of normal or abnormal based on the current diagnostic model.

3. The state diagnostic device according to claim 1, wherein the state diagnostic device determines whether the component is normal or abnormal as a result of the diagnosis based on the diagnostic model, and the consistency determination unit determines that the consistency is satisfied when the determination results about normal or abnormal agree between the current diagnostic model and the new diagnostic model with respect to every component, and when a certainty factor of the determination results of normal or abnormal based on the new diagnostic model is not lower than that of the determination of normal or abnormal based on the current diagnostic model.

\* \* \* \* \*